United States Patent
Tsirkin

(10) Patent No.: US 10,521,206 B2
(45) Date of Patent: Dec. 31, 2019

(54) SUPPORTING COMPILER VARIABLE INSTRUMENTATION FOR UNINITIALIZED MEMORY REFERENCES

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

( * ) Notice: Subject to any disclaimer, the term of this patent is extended or adjusted under 35 U.S.C. 154(b) by 96 days.

(21) Appl. No.: 15/689,813

(22) Filed: Aug. 29, 2017

(65) Prior Publication Data

US 2019/0065161 A1    Feb. 28, 2019

(51) Int. Cl.
  *G06F 9/44*   (2018.01)
  *G06F 8/41*   (2018.01)
  *G06F 8/33*   (2018.01)
  *G06F 11/34*  (2006.01)

(52) U.S. Cl.
  CPC .............. *G06F 8/441* (2013.01); *G06F 8/33* (2013.01); *G06F 8/433* (2013.01); *G06F 8/4434* (2013.01); *G06F 11/34* (2013.01)

(58) Field of Classification Search
  CPC combination set(s) only.
  See application file for complete search history.

(56) References Cited

U.S. PATENT DOCUMENTS

| 5,493,675 A * | 2/1996 | Faiman, Jr. ............. G06F 8/433 717/144 |
| 7,613,954 B2 | 11/2009 | Grey et al. |
| 7,733,857 B2 | 6/2010 | Wybenga et al. |
| 2006/0143527 A1 | 6/2006 | Grey et al. |
| 2011/0022893 A1 * | 1/2011 | Yang .................. G06F 11/3608 714/33 |

OTHER PUBLICATIONS

Evgeniy Stepanov and Konstantin Serebryany, MemorySanitizier: fast detector of uninitialized memory use in C++, IEEE, 2015, retrieved online on Aug. 9, 2019, pp. 46-55. Retrieved from the Internet: <URL: http://delivery.acm.org/10.1145/2740000/2738607/p46-stepanov.pdf?>. (Year: 2015).*

Anushri Jana et al., "Precise Detection of Uninitialized Variables Using Dynamic Analysis—Extending to Aggregate and Vector Types", TCS Innovation Labs—Software R&D, 2012 19th Working Conference on Reverse Engineering, IEEE Computer Society, 5 pages.

(Continued)

*Primary Examiner* — Hanh Thi-Minh Bui
(74) *Attorney, Agent, or Firm* — Lowenstein Sandler LLP

(57) ABSTRACT

Implementations of the disclosure provide systems and methods for ensuring that the value for any local function variable is initialized before it is used during the execution of the function. The method comprises identifying, by a processor executing a compiler, a reference to a local variable in a source code. It is determined that there can be a usage of the local variable in an uninitialized state as an operand for an operation. In the source code, a notation is identified that is associated with the local variable for suppressing a warning by the compiler with respect to using the local variable in the uninitialized state as an operand for an operation, In view of the source code, an object code is generated for tracking initialization and usage of the local variable at runtime.

15 Claims, 8 Drawing Sheets

(56) References Cited

OTHER PUBLICATIONS

Using the GNU Compiler Collection (GCC): Warning Options; https://gcc.gnu.org/onlinedocs/gcc/WarningOptions.html; 40 pages; Jun. 23, 2017.
ARS Technica OpenForum; "C#: Can you test an Unassigned Variable, or Even Build it That Way?"; https://arstechnica.com/civis/viewtopic.php?t=36020, Mar. 2010, 14 pages.
Solutions to Assignment 3; "CSCI 371: Programming Language Principles"; http://mcs.uwsuper.edu/sb/371/Hw/hw3ans.php, Jun. 23, 2017, 4 pages.

* cited by examiner

600

```
┌─────────────────────────────────────────────────────────────────┐
│                                                                 │
│                           Receive                               │
│       source code of a function comprising a local variable     │
│                                                            610  │
└─────────────────────────────────────────────────────────────────┘
                                 │
                                 ▼
┌─────────────────────────────────────────────────────────────────┐
│                          Generate                               │
│  a prologue for the function to initialize a first indicator    │
│    and a second indicator associated with a local variable      │
│                                                            620  │
└─────────────────────────────────────────────────────────────────┘
                                 │
                                 ▼
┌─────────────────────────────────────────────────────────────────┐
│                         Instrument                              │
│ the source code to update the first indicator upon              │
│ initialization of the local variable in the function call, and  │
│ update the second indicator upon the local variable being       │
│ used in the function by combining values of the first           │
│ indicator and the second indicator                              │
│                                                            630  │
└─────────────────────────────────────────────────────────────────┘
                                 │
                                 ▼
┌─────────────────────────────────────────────────────────────────┐
│                          Generate                               │
│ an epilogue for the function to conditionally continue the      │
│ execution of the function call in view of analyzing the         │
│ second indicator                                                │
│                                                            640  │
└─────────────────────────────────────────────────────────────────┘
```

FIG. 6

SUPPORTING COMPILER VARIABLE INSTRUMENTATION FOR UNINITIALIZED MEMORY REFERENCES

TECHNICAL FIELD

The implementations of the disclosure relate generally to software development processing and, more specifically, relate to supporting compiler variable instrumentation for uninitialized memory references.

BACKGROUND

Programs may be written in a high level programming language. A program text in the high level language, often referred to as source code, is translated by a compiler program into an object code, which may undergo further transformations to finally become executable by a computer.

BRIEF DESCRIPTION OF THE DRAWINGS

The disclosure is illustrated by way of examples, and not by way of limitation, and may be more fully understood with references to the following detailed description when considered in connection with the figures, in which:

FIG. 6 is a flow diagram of a method of utilizing compiler variable instrumentation for uninitialized memory references according to an implementation of the disclosure.

DETAILED DESCRIPTION

Figure 1:
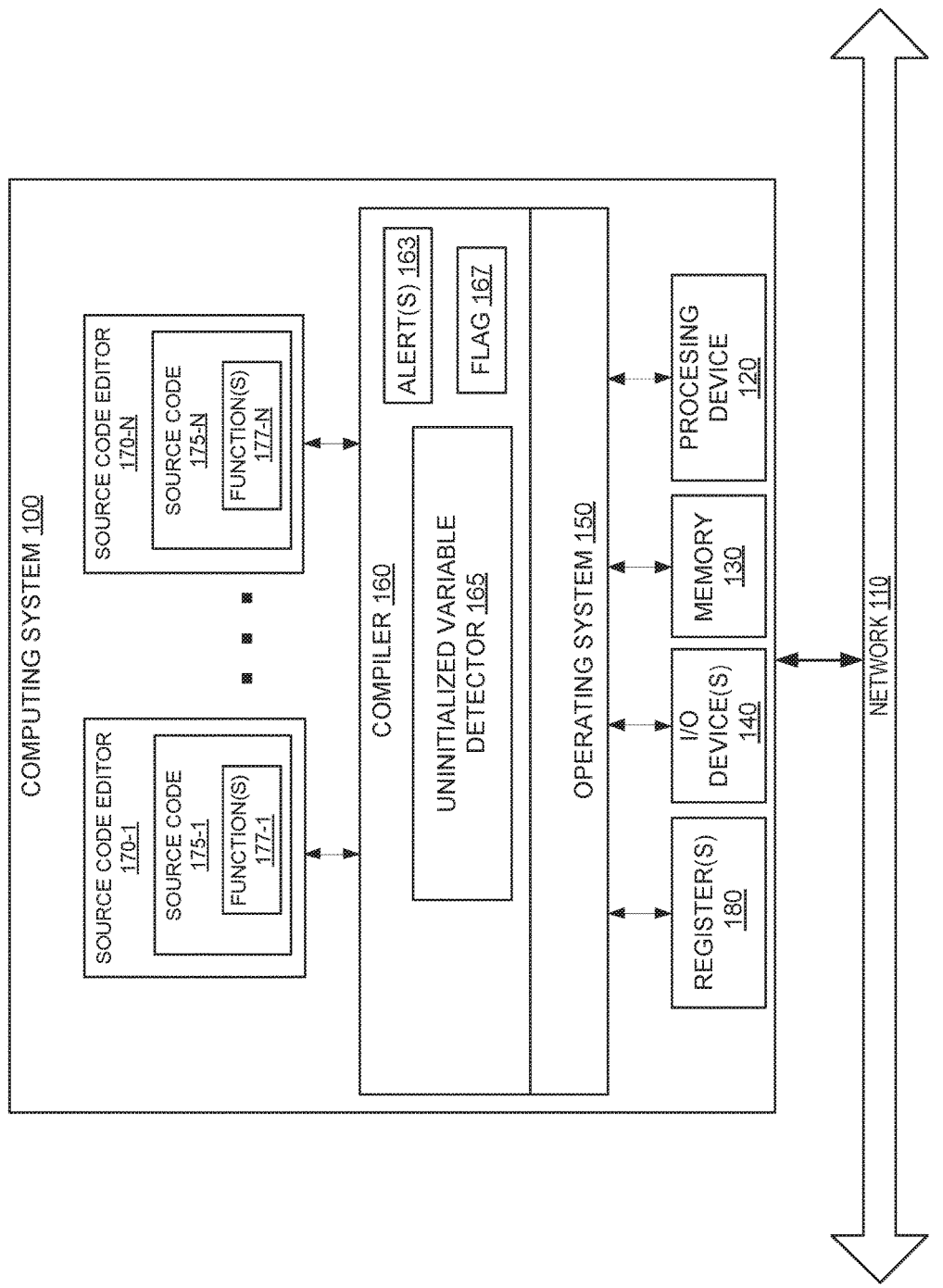
FIG. 1 is a block diagram of a computing system in which implementations of the disclosure may operate.

Many computing environments include user applications installed on a computing device. These user applications may include a software development environment for programmers to develop applications to be executed by the computing device. The software development environment may include a source code editor and a compiler. The source code editor is a program editor that provides a user interface to allow programmers to write source code of an application in a particular programming language. For example, programmers may use the source code editor to write a particular application in a programming language (such as C or C++) that is understandable by human programmers. A compiler is a type of application that may transform the source code written in high-level programming languages into low-level programming languages into an intermediate representation referred to as an object module.

The application source code may include a declaration of a memory variable which may be stored on a stack or in a processor register. A stack is a linear list type data structure in which all additions and deletions are restricted to one end of the list (such as the top of the list). The stack serves several purposes in the execution of an application. For example, the stack can be used to keeping track of where to return to when calling a function, the storage of local variables in the context of a function call, and passing arguments from caller (or first) function to callee (or second) function. A function is a module or block of program code of the application that can perform a particular task when executed by the computing device. Every function may include three components, such as a function prologue, a function body and a function epilogue. Function prologue is the part of function to do all the work needed to start up the function. The function body is where all work is accomplished for the particular task of the function and the function epilogue cleans up any used memory before the function is completed and returns the execution control to the caller.

When writing source code for the functions, some programmers try to arrange the source code in a way to make sure each local variable is correctly initialized before it is used within a particular function. If, for example, a variable is uninitialized (that is not set to a definite value before it is used), this may cause various runtime errors. Some compilers are able to detect the use of uninitialized variables. In certain situations, the compilers may generate an alert indicating that a variable is uninitialized even when in certain situations a value may be correctly assigned to the variable. For example as shown in the following source code:

```
void foo(int y)
{
    int x;
    switch (y)
    {
        case 1: x = 1; break;
        case 2: x = 4; break;
        case 3: x = 5;
    }
}
```

When the above source code is compiled, some compilers may warn that x is an uninitialized variable, even though x is initialized if the function foo is called with the values 1, 2 or 3. In some instances, the programmers may want to write source code that uses the variables in this manner because they know that the function will always be called with correct values. Some compilers may allow programmers to insert various type of instrumentation notation (e.g., an instruction) in the program that instructs the compiler to ignore certain uninitialized variables. For example, in a variable declaration for a function, the variable may be assigned to itself, e.g., int ret=ret, or the source code can be modified to instrument the value of a particular variable or function, e.g., int ret_attribute((uninitialized)).

There are, however, several issues that can occur due when using such compiler instrumentation techniques. For example, the compiled the code using certain programmer-based instrumentation, may suppress certain uninitialized variable warnings from the compiler, such as in cases where the variable may be initialized under particular conditions. In such cases, future code changes can lead to the variables being used before initialization and produce unpredictable results when the code is executed. As such, the development of the source code to avoid these situations can significantly increase in overhead to create and otherwise maintain.

Implementations of the disclosure address the above-mentioned and other deficiencies by providing an uninitialized variable detector for ensuring that the value for any local function variable is initialized before it is used during the execution of the function. The uninitialized variable detector may be installed at the compiler to detect certain uninitialized variables that are being suppressed do to the use of certain variable notation, such as by attribute annotation (e.g., uninitialized) or assigning the variable to itself. In such cases, the uninitialized variable detector generates an object code for tracking initialization and usage of the local variable at runtime.

In some implementations, this object code generated by the uninitialized variable detector may include, for example, a first object code fragment in the prologue for initializing a first indicator associated with the local variable and a second indicator associated with the local variable, a second object code fragment to instrument the function body for updating the first indicator upon initialization of the local variable, and a third object code fragment for the epilogue for updating the second indicator upon using the local variable as an operand of an operation.

The uninitialized variable detector may reserve space for the two (a first and second) indicators (e.g., allocate two extra bits on the stack or in a register storing the local variable) to mark the initialization and/or use of an instrumented variable, and generate a function prologue and a function epilogue for the function associated with the instrumented variable. When compiling the source code, the uninitialized variable detector may generate the prologue to initialize the first indicator to a value (e.g, 0) indicating that the instrumented variable is uninitialized, and the second indicator to a value (e.g., 1) indicating that the instrumented variable has not been used.

During the compilation of the source code, the uninitialized variable detector further instruments the function by inserting instructions in the code when an initialization of the instrumented variable is detected. For example, uninitialized variable detector may instrument the function to set the first indicator to a value (e.g., a value of 1) to indicate the variable has been initialized. For each access of the instrumented variable in the source code, the uninitialized variable detector inserts further instructions in the function to read both the first indicator and the second indicator from the stack for the variable. Thereupon, the first and second indicators are combined using, for example, a mathematical operation ("AND"), and then the resulting value of the mathematical operation is stored back at the location of the second indicator. For example, the AND operation takes two equal-length binary representations and performs the logical AND operation on each pair of the corresponding bits, by multiplying them. An example of using the indicators along with the AND operation is as follows:

|  | Uninitialized | Used | Function Steps |
|---|---|---|---|
| Instrumented Variable | [0] | [1 (not used)] <– | prologue set values |
|  | [0] | [0 (used)] <– | access var [0 AND 1] op |
|  | [0] | [0 (used)] <– | access var [0 AND 0] op |
|  | [1 (initialized)] | [0 (used)] <– | initialize var |
|  | [1] | [0 (used)] <– | epilogue examine values |

The epilogue examines the second indicator to determine whether to conditionally continue the execution of the function associated with the instrumented variable. For example, the uninitialized variable detector may configure the epilogue to read the second indicator. If the second indicator indicates the instrumented variable is used (e.g., value of 0), then the variable has been used uninitialized and the epilogue may abort the function call. Otherwise, the second indicator may be a value (e.g, value of 1) indicating that the variable has not been used or has been used initialized. In such a case, the epilogue may continue with the execution of the function by performing a clean up the stack and returns the stack to the state it was before the function was called.

FIG. 1 is a block diagram of a computing system 100 in which implementations of the disclosure may operate. As shown in FIG. 1, the computer system 100 may be coupled to a network 110, and include a processing device 120 communicatively coupled to a memory 130, and other hardware resources such as network interfaces, hard drives, registers 180 and input/output (I/O) devices 140. The processing device 120 may be a hardware processor (or processing core) or central processing unit (CPU) of the computing system 100. The memory 130 may provide storage space for applications executed by the processing device 120.

"Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. Although, for simplicity, a single processor 120 is depicted in FIG. 1, in some other embodiments computer system 100 may comprise a plurality of processors. Similarly, in some other embodiments computer system 100 may comprise a plurality of I/O devices, rather than a single device 140.

The computer system 100 may be a server, a mainframe, a workstation, a personal computer (PC), a mobile phone, a palm-sized computing device, etc. The network 110 may be a private network (e.g., a local area network (LAN), a wide area network (WAN), intranet, etc.) or a public network (e.g., the Internet). In one implementation, the hardware resources of the computing system 100 may operate within a computing environment which may include software resources of system applications and user applications. The system applications may include an operating system 150 that may manage operations of hardware resources and provide common services to software applications. For example, the operating system 150 may schedule the execution of system applications and user applications on the processing device 120.

In addition to the operating system 150, the computing environment may include user applications installed on the computing system 100. In one implementation, the user applications may include a software development environment for programmers to develop applications on the computing system 100. The software development environment may include one or more source code editors 1701-1 through N, source code 175-1 through N, and a compiler 160. The source code editor 170-1 through N is a program editor that may provide a user interface to allow programmers to write source code of an application in a particular programming language. For example, programmers may use the source code editor 170-1 through N to write an application in a programming language (such as C or C++) that is understandable by human programmers. The compiler 160 is a program that may transform the source code 175-1 through N written in high-level programming languages (such as C, C++) into low-level programming languages (such as assembly code) that may be translated into machine code executable by the processing device 120. In some implementations, the compiler 160 may generate various alerts 163 or warnings if it is determined that the complied source code 175-1 through N include one or more compilation errors.

During the development of the source code, programmers may write the source code 175-1 through N to include calls to certain routines. These routines may be functions 177-1 through N that may be reused by different applications. A function 177-1 through N may be a module or block of program code dealing with a particular task. A function 177-1 through N may be called by a caller function. The caller function may pass certain parameters to the function functions 177-1 through N. After execution, the function functions 177-1 through N may return to the caller function so that the caller function may continue. In this regard, the function 177-1 though N may use a stack to keep track of where to return for the caller function, the storage of local variables in the context of a function call, and passing arguments from caller (or first) function to callee (or second) function. The stack is a linear list type data structure in which memory space dedicated to an application is allocated, for example, by the operating system 150, to support the function 177-1 through N calls.

When writing source code 175-1 through N for the functions 177-1 though N, some programmers try to arrange the source code in a way to make sure each local variable is correctly initialized before it is used within a particular function. If, for example, a variable is uninitialized that is not set to a definite known value before it is used, this may cause various runtime errors. Some compilers may allow programmers to insert various type of instrumentation notation (e.g., programming notation) in the source code 175-1 through N that instructs the compiler 160 to ignore certain uninitialized variables. This, however, can lead to the suppression of certain uninitialized variable warnings by the compiler 160, such as in cases where the variable may be initialized under particular conditions.

Computer system 100, in various implementations, may include an application, such as the uninitialized variable detector 165, which is installed to at the compiler 160 to provide support for detecting uninitialized variables in the source code 175-1 through N. In some implementations, the uninitialized variable detector 165 may, for each local variable, reserve memory space, for example, on the stack or in a register 180 where the variable is stored for two indicators to mark the initialization and/or use of an instrumented variable in the source code 175-1 through N. For example, the first indicator may indicate whether the instrumented variable is initialized or uninitialized and the second indicator may indicate whether the instrumented variable has been used or has not used during the execution of the function 177-1 through N.

To utilize features of computing system 100 as disclosed herein, a flag 167 may be used to inform the compiler 160 to generate or modify a version of the prologue and epilogue in accordance with instructions from the uninitialized variable detector 165. For example, if the flag is set (e.g., set to certain value), the uninitialized variable detector 165 may instruct the compiler when compiling the source code 175-1 through N to generate a prologue to set values for the two indicators for the instrumented variable and an epilogue to determine whether to continue or abort the execution of the function in view of the current values of the first and the second indicators set in the stack. If the flag 167 is not set, then the compiler 160 may operate as normal and not receive instructions from the uninitialized variable detector 165.

The functionally of the uninitialized variable detector 165 can exist in a fewer or greater number of modules than what is shown, with such modules residing at one or more components of computer system 100, which may be geographically dispersed. The uninitialized variable detector 165 may be operable in conjunction with the compiler 160 from which it may receive and determine relevant information regarding the source code 175-1 through N to be compiled as further discussed below.

Figure 2:
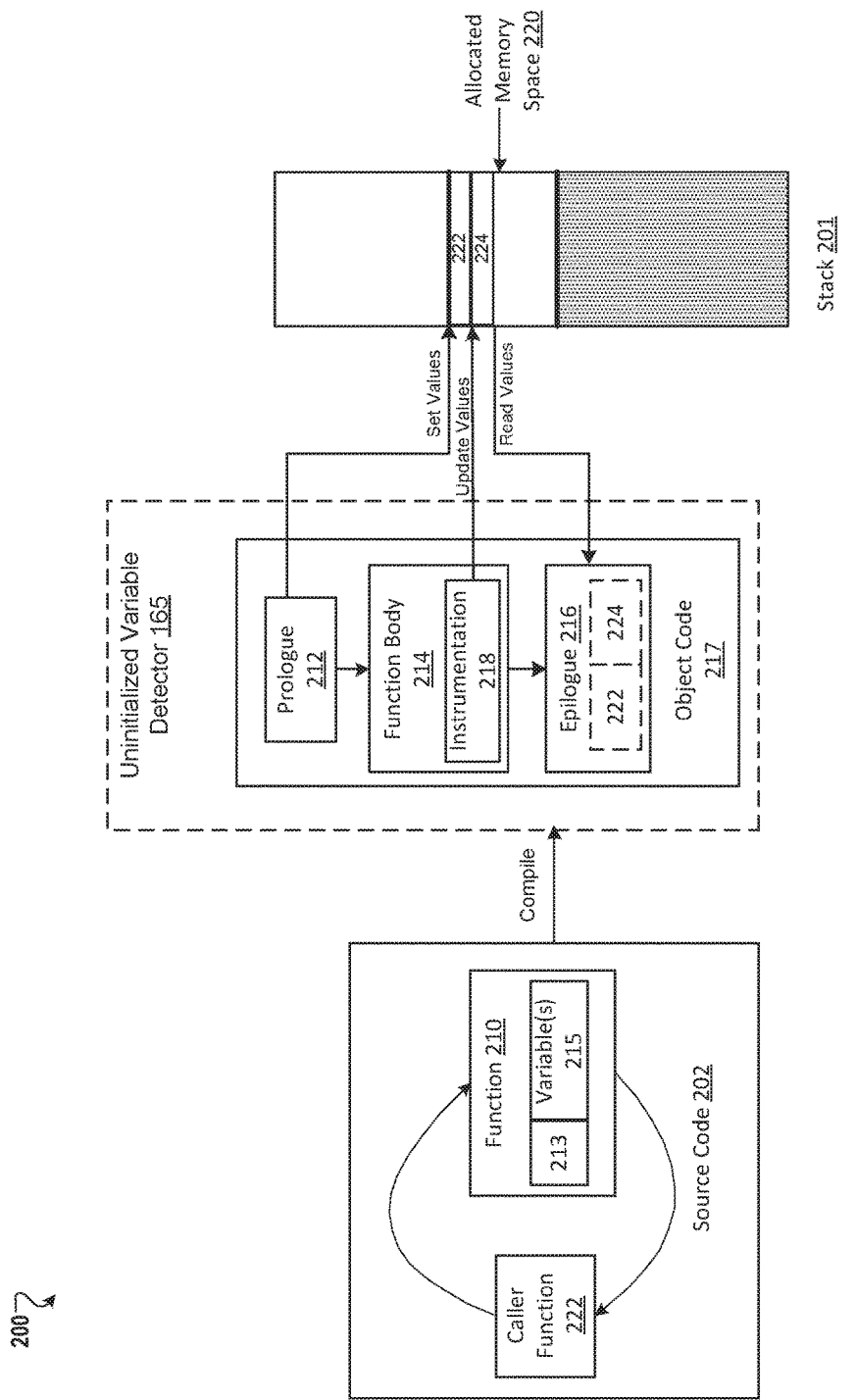
FIG. 2 is a block diagram of a system comprising a data structure according to an implementation of the disclosure.

FIG. 2 is a block diagram of a system 200 comprising a data structure, such as stack 201 according to an implementation of the disclosure. The system 200 may be employed for supporting compiler variable instrumentation for uninitialized memory references in which values of variables are stored. As shown, the system 200 may include the uninitialized variable detector 165 of FIG. 1. The uninitialized variable detector 165 may detect may reserve memory space on the stack 201 for two indicators 222, 224 to mark the initialization and/or use of a variable in the source code 202 of a function 210. The stack 201 is a linear list type data structure in which all additions and deletions are restricted to one end of the list (such as the top of the list). For example, the stack 201 may represent a last-in-first-out stack of data in which "push" and "pop" operations are provided to push or add data to the stack 201 and pop or otherwise remove data from the stack 201.

System 200, in implementations, can be used to develop source code 202 stored in a data store (not shown). For example, the source code 202 may be developed using a source code editor, such as source code editor 170-1 through N of FIG. 1. The source code 202 may include code of a caller function 222 (or a parent function) and a function 210 (or child function) called by the caller function within the scope of the caller function 222. The caller function 222 may call the function 210 to perform certain tasks. After completing the execution of the function 210 such as the finishing the tasks, the execution may be returned to the caller function 222. In one implementation, the caller function 222 may be called by another caller function (not shown) to form a function calling chain.

The system 200 may execute a compiler, such as compiler 160 of FIG. 1, to compile the source code 202 into object code 217. With respect to the function 210, the compiler may compile the source code of the function 210 into function body assembly code 214 that performs the tasks encoded in the function source code 202. In addition to the function body assembly code 214, the compiler may also generate a prologue 212 and/or an epilogue 216 to prepare an memory space 220 allocated to the function body object code 217 on the stack 201. For example, the stack 201 may have been assigned by the operating system, such as operating system 150, of system 200 to an application including the caller function 222 and the function 210.

When compiling the source code 202, the uninitialized variable detector 165 may inform the compiler 160 to use a modified version of the prologue 212 and epilogue 216 functions to ensure that the value for any local function variable, such as variable 215, of the function 210 is initialized before it is used during the execution of the function 210. In some implementations, the uninitialized variable detector 165 may inform the compiler 160 if it determines a possible usage of the local variable 215 in an uninitialized state as an operand for an operation, such as in function 210. For example, as shown in the following source code:

```
void foo(int y)
{
int x;
switch (y)
{
    case 1: x = 1; break;
    case 2: x = 4; break;
    case 3: x = 5;
}
```

When the above source code is compiled, some compilers generates a compiler warning, such as one of the alerts 163, that x is an uninitialized variable, even though x is initialized if the function foo is called with the values 1, 2 or 3.

Responsive to determining that there can be a usage of the local variable 215 in an uninitialized state as an operand for an operation 210, the uninitialized variable detector 165 may identify a notation 213 along with the local variable 215 in the source code 202 that may be used to suppress a compiler warning 163 with respect to using the local variable 215 in the uninitialized state as an operand for an operation 215. For example, the instrumentation notation 213 in the source code 202 may include, but not limited to, an attribute notation (e.g., uninitialized) assigned to the variable 215 or a code statement assigning a value of the local variable 215 to the local variable 215.

Responsive to detecting the instrumentation notation 213 for at least one variable 215, the uninitialized variable detector 165 generates an object code 217 for tracking initialization and usage of the local variable 215 at runtime. This object code 217 may include a first object code fragment in the prologue 212 for initializing a first indicator 222 associated with the local variable 215 and a second indicator 224 associated with the local variable 215, a second object code fragment 218 to instrument the function body 214 for updating the first indicator 222 upon initialization of the local variable 215, and a third object code fragment for the epilogue 216 for updating the second indicator 224 upon using the local variable as an operand of an operation 215.

In some implementation, the uninitialized variable detector 165 may reserve a storage location for a first indicator 222 and a second indicator 224 for the variable 215, for example, on the stack 201. For example, the first indicator 222 and the second indicator 224 may be two extra bit flags stored in the stack 201 or in the register 180 where the local variable resides, to holds values, respectively, for the first indicator 222 and the second indicator 224. The first indicator 222 is used to indicate whether the variable 215 is initialized or uninitialized and the second indicator 222 is used to indicate whether the variable 215 has been used or has not been used during the execution of function 210. For example, the first indicator 222 may be set to a first value (e.g., a value of 0) to indicate the variable is uninitialized and a second value (e.g., a value of 1) to indicate the variable has been initialized. Similarly, the second indicator 224 may be set to a first value (e.g., a value of 1) to indicate the variable has not been used and a second value (e.g., a value of 0) to indicate the variable has been used.

The function prologue 212 generated by the uninitialized variable detector 165 sets initial values for the first indicator 222 and the second indicator 224. For example, the function prologue 212 is executed at the start of the function 210 to reserve space for local variables and other values on the stack 201 or in one or more processor registers, such as registers 180. In that regard, the uninitialized variable detector 165 may insert instructions in the prologue to set the first indicator 222 to a value (e.g., a value of 0) that indicates the variable 215 is uninitialized and the second indicator 224 to a value (e.g., a value of 1) that indicates the variable 215 has not been used.

The uninitialized variable detector 165 may then instrument the source code 202 for each initialization of the variable 215 to set the first indicator 222 upon initializing the variable. Each time there is a detected access of the variable 215 during the execution of the function 210, the uninitialized variable detector 165 further instruments the source code 202 to read a first value from the first indicator 222 and a second value from the second indicator 224. The first value and the second value are combined (e.g., by logical AND) to generate a resulting value, which is then stored back in the second indicator 224.

To combine the first indicate 222 and the second indicator 224, a mathematical operation ("AND") may be used. For example, the AND operation takes two equal-length binary representations and performs the logical AND operation on each pair of the corresponding bits, by multiplying them. An example of using the indicators 222 and 224 along with the AND operation is as follows:

| | Uninitialized | Used | Function Steps |
|---|---|---|---|
| Instru- | [0] | [1 (not used)] <– | prologue set values |
| mented | [0] | [0 (used)] <– | access var [0 AND 1] op |
| Variable | [0] | [0 (used)] <– | access var [0 AND 0] op |
| | [1 (initialized)] | [0 (used)] <– | initialize var |
| | [1] | [0 (used)] <– | epilogue examine values |

The epilogue 216 generated by the uninitialized variable detector 165 is instructed to determine whether to continue or abort the execution of the function in view of the updated values of the first indicator 222 and the second indicator 224. For example, epilogue 216 is executed before the function is completed and returns from being called, for example, by the caller function 222. In this regard, the epilogue 216 reads the value for second indicator 224 off the stack 201. If the second indicator 224 indicates the variable 215 is used, then the variable 215 has been used uninitialized and the epilogue 216 is instructed by the uninitialized variable detector 165 to abort the execution of the function 210. In such as case, the epilogue 216 may generate an alert indicating that variable 215 is used uninitialized. Otherwise, the epilogue 216 is instructed by the uninitialized variable detector 165 to complete the function 210 call by returning the stack to the state it was before the function 210 was called by the caller function 222.

Figure 3:
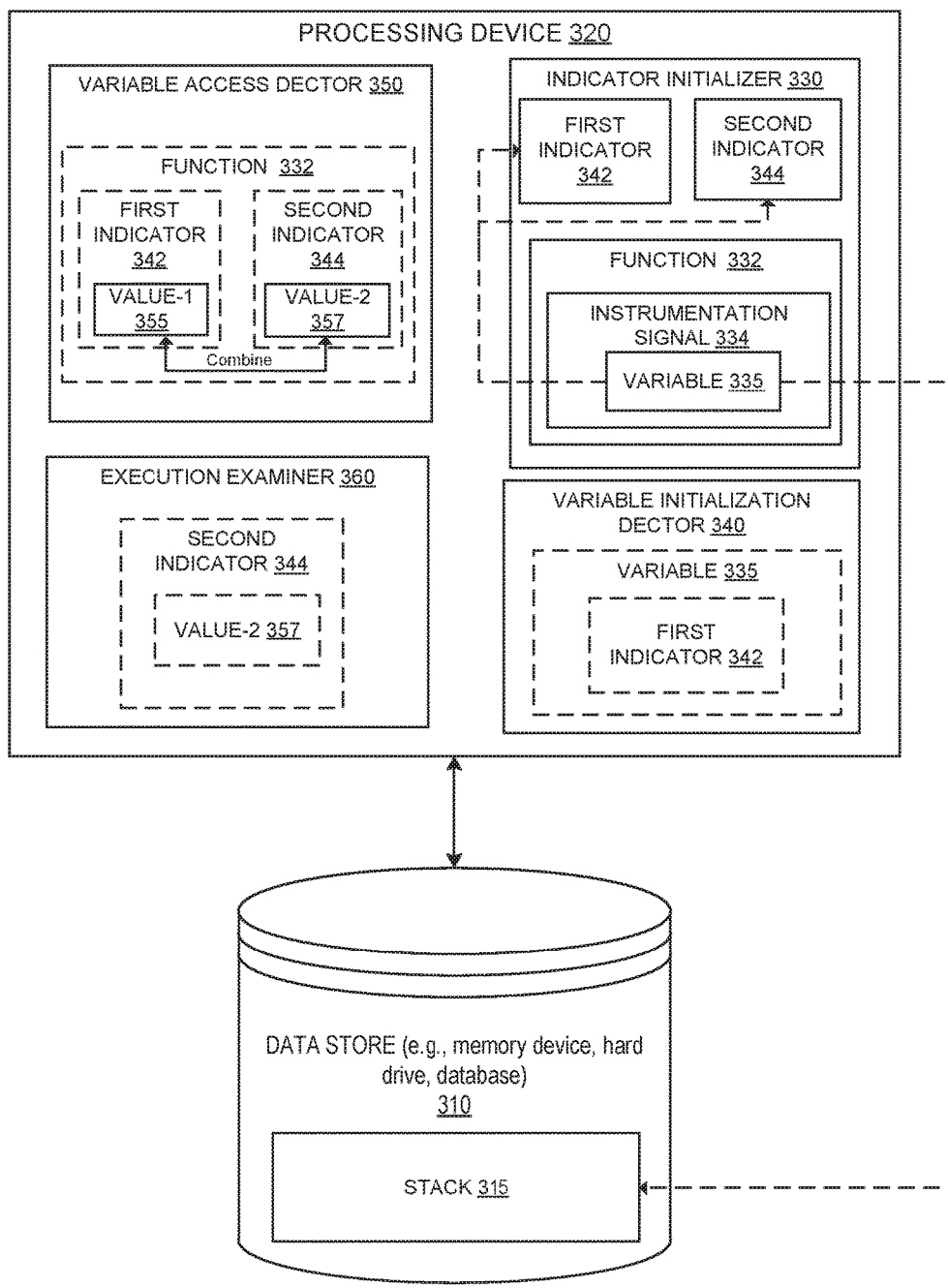
FIG. 3 is a block diagram of an apparatus including a data store to support compiler variable instrumentation for uninitialized memory references in an implementation of the disclosure.

FIG. 3 is a block diagram of an apparatus 300 including a data store 410 to support compiler variable instrumentation for uninitialized memory references in an implementation of the disclosure. The apparatus 300 may be the same or similar to the computer system 100 of FIG. 1 or system 200 of FIG. 2. In some implementations, the apparatus 300 may include processing device 320, operatively coupled to the data store 310, to execute instructions for carrying out the operations for compiling source code as discussed herein. As shown, the apparatus 300 may execute instructions for an indicator initializer 330, a variable initialization detector 340, variable access detector 350, and an execution examiner 360 determine whether to continue or abort the execution of a function.

Data store 410 may include any non-persistent data storage (e.g., memory), persistent and/or volatile data storage (e.g., flash storage, hard drive, tape), other medium, or combination thereof that is capable of storing instructions for carrying out the operations of the apparatus 300 discussed herein. In some implementations, the data store 310 may store a stack 315. For example, a memory space dedicated to function 332 may be organized as a stack 315 of a certain size (e.g., 8 megabytes). The stack 310 can be used to keeping track various operations associated with executing the function 332, such as where to return to when calling the function 332, the storage of local variables in the context of the function 332, and passing arguments related to the function 332.

In operation of apparatus 300, the indicator initializer 330 initializes a first indicator 342 and a second indicator 344 associated with a local variable 335 in an execution of a function call 332. In this regard, the function 332 is to allocate the variable 335 to a stack 315. For example, the stack 315 is a linear list type data structure in which all additions and deletions are restricted to one end of the list (such as the top of the list). The stack 315 may have been assigned by the operating system, such as operating system 150, to an application associated with function 332. In some implementations, the first indicator 342 and the second indicator 344 may be two extra bit flags pushed onto the stack 315 to holds values, respectively, for the first indicator 342 and the second indicator 344. In other implementations, a plurality of registers associated with the processing device 320 may be used to store values for the first indicator 342 and the second indicator 344. The indicator initializer 330 may initially set the first indicator 342 to a value (e.g., a value of 0) that indicates the variable 335 is uninitialized and the second indicator 344 to a value (e.g., a value of 1) that indicates the variable 335 is not used at this point in the execution of function 332.

The variable initialization detector 340 updates the first indicator 342 upon detecting an initialization of the local variable 335 in the function call 332. For example, variable initialization detector 340 a value 355 associated with the first indicator 342 to a value (e.g., a value of 1) to indicate the variable 335 has been initialized.

The variable access detector 350 updates the second indicator 344 upon the local variable 335 being used in the function 332 by combining values 355, 357 of the first indicator 342 and the second indicator 344. For example, the variable access detector 350 may detect that the variable 335 is used as an operand in a operation of the function 332. Each time there is a detected use of the variable 335 in the function 332, a first value 355 is read from the first indicator 342 and a second value 357 is read from the second indicator 344. The first value 355 and the second value 357 are combined to generate a resulting value, which is then stored back in the second indicator 344. To combine the first value 355 and the second value 377, a mathematical operation ("AND") may be used. For example, the AND operation takes two equal-length binary representations and performs a logical AND operation on each pair of the corresponding bits, by multiplying them.

The execution examiner 360 may determine whether to continue or abort the execution of the function 332 in view of analyzing the second indicator 344. For example, before the execution of function 332 is complete, the execution examiner 360 determines whether the variable 335 has been used in the function 332 before initialization. In this regard, the execution examiner 360 reads the value 357 for the second indicator 344 off the stack 315. If the second indicator 344 indicates the variable 335 is used, then the variable 335 has been used uninitialized and the execution examiner 360 aborts the execution of the function 332. In such as case, the the execution examiner 360 may generate an alert indicating that variable 335 is used uninitialized. Otherwise, the execution examiner 360 completes the function 332 call by cleaning up the stack 315.

Figure 4:
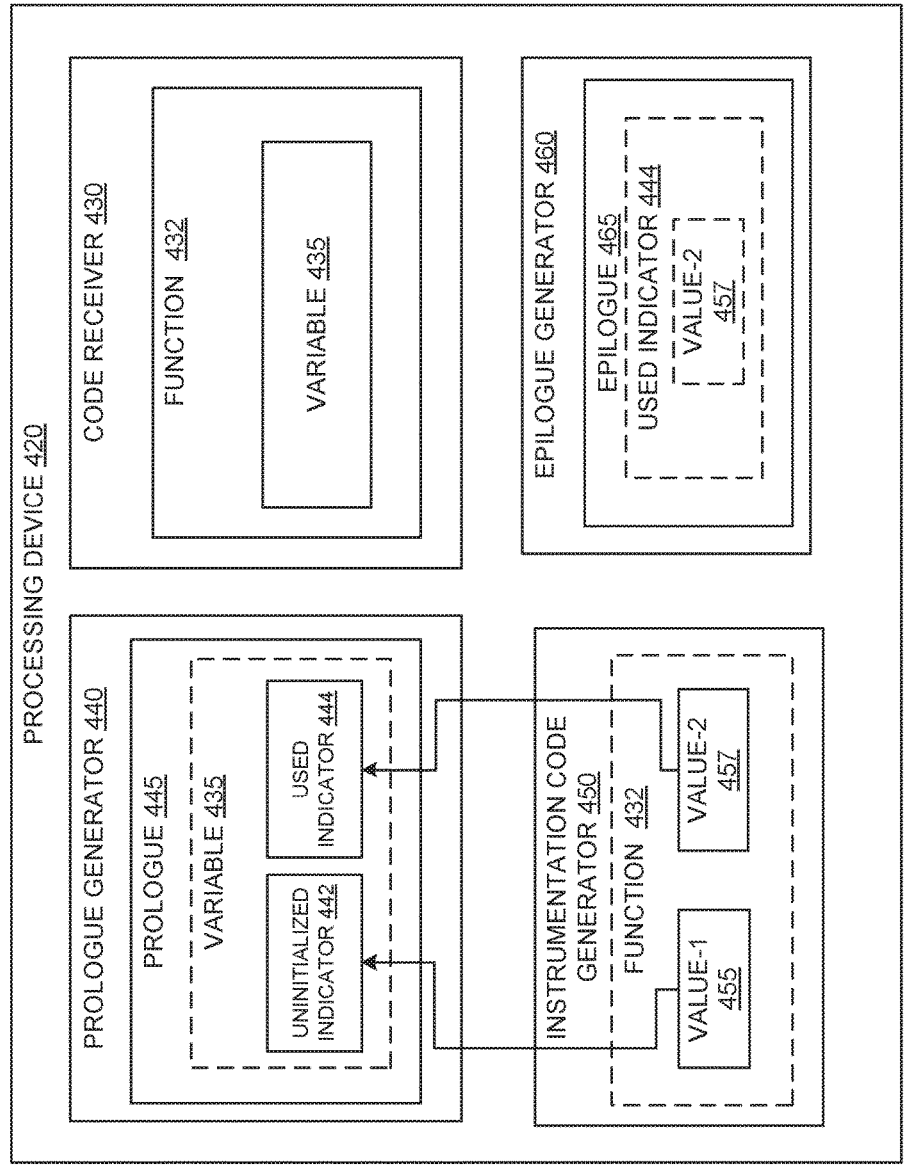
FIG. 4 is a block diagram of an apparatus to support compiler variable instrumentation for uninitialized memory references according to an implementation of the disclosure.

FIG. 4 is a block diagram of an apparatus 400 to utilize compiler variable instrumentation for uninitialized memory references according to an implementation of the disclosure. The apparatus 400 may be the same or similar to a components within system 100 of FIG. 1 and system 200 for FIG. 2. In some implementations, the apparatus 400 may comprise hardware (circuitry, dedicated logic, etc.), software (e.g., software executed by a general purpose computer system or a dedicated machine), or a combination of both. In some implementations, the apparatus 400 may include a processing device 420 (which may be the same as the processing device 120) to execute instructions for carrying out the operations of the apparatus 400 as discussed herein. As shown, the apparatus 400 may execute instructions for a code receiver 430, a prologue generator 440, an instrumentation code generator 450, and an epilogue generator 460.

In operation, the code receiver 430 receives source code of a function 432 comprising an instrumented variable 435 to allocate to a storage location. For example, the storage location may be a stack such as stack 201 of FIG. 2 or stack 315 of FIG. 3. In some implementations, the storage locations may be a plurality of registers associated with the processing device 420. For example, the storage locations may include a first register to store values for the first indicator 442 and a second register to store values for the second indicator 444.

The prologue generator 440 generates a prologue 445 for the function to initialize a first indicator 442 and a second indicator 444 associated with the variable 435. For example, the prologue 445 may initialize the first indicator 442 to a value (e.g, 0) indicating that the variable 435 is uninitialized, and the second indicator 444 to a value (e.g., 1) indicating that the variable 435 has not been used.

The instrumentation code generator 450 may generate code for the function 432 to update values 455, 457 for a first indicator 442 and a second indicator 444 associated with the variable 435. In this regard, the first indicator 442 indicates whether the instrumented variable was uninitialized, and the second indicator 444 indicates whether the instrumented variable 435 was used uninitialized during the executing function. When updating the values 455, 457, if an access of the variable 435 is detected during the executing of the function 432, a value 455 is read from the first indicator 442 and a value 457 is read from the second indicator 444. Then, the values 455, 457 are combined to generate a resulting value, which is stored in the second indicator 444.

The epilogue generator 460 generates an epilogue 465 epilogue for the function 435 to conditionally continue the execution of the function 435 in view of analyzing the second indicator 444. For example, if the value 457 of the second indicator 444 indicates the variable 435 was used (e.g., value of 0), then the variable has been used uninitialized and the epilogue 465 may abort the function 435. Otherwise, the value 457 of the second indicator 444 may indicate that the variable 435 has not been used or has been used initialized. In such a case, the epilogue 465 may continue with the execution of the function 432 by performing a clean up the stack and returns the stack to the state it was before the function 432 was called.

Figure 5A:
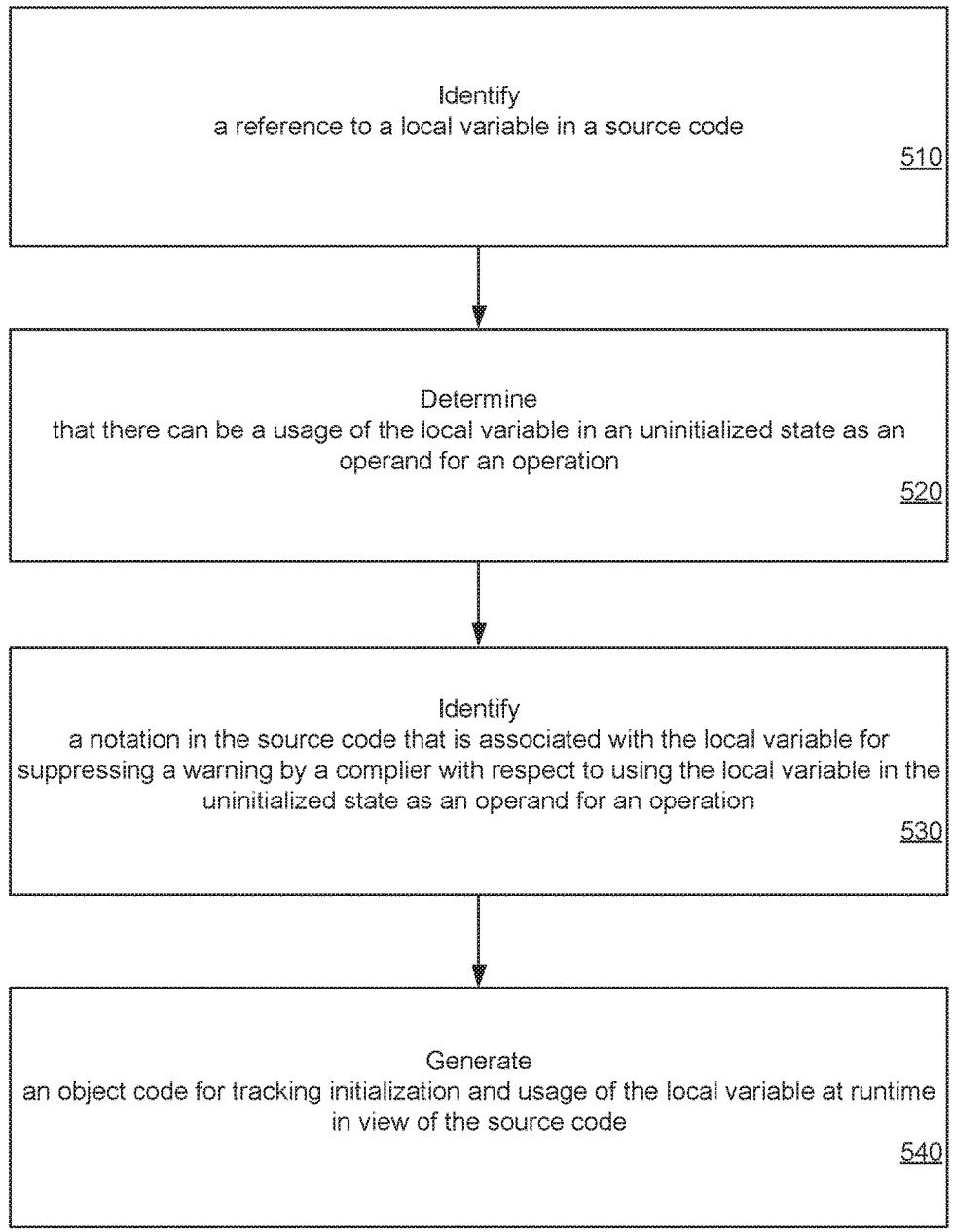
FIGS. 5A-5B are flow diagrams of a method of supporting compiler variable instrumentation for uninitialized memory references according to an implementation of the disclosure.

FIG. 5A is a flow diagram of a method 500 of supporting compiler variable instrumentation for uninitialized memory references according to an implementation of the disclosure. In one implementation, method 500 may be performed by the uninitialized variable detector 165 as executed by processing device 120 of FIG. 1 as described herein. The method 500 may be performed by processing logic that may comprise hardware (circuitry, dedicated logic, etc.), software (e.g., software executed by a general purpose computer system or a dedicated machine), or a combination of both. In alternative implementations, some or all of the method 500 may be performed by other components of system 100. It should be noted that blocks depicted in FIG. 5A can be performed simultaneously or in a different order than that depicted.

Referring to FIG. 5A, method 500 begins at block 510 where a reference to a local variable 215 in a source code 202 is identified. In block 520, a determination is made that there can be a usage of the local variable 215 in an uninitialized state as an operand for an operation 210. A notation 213 in the source code is identified in block 530 that is associated with the local variable for suppressing a warning 163 by a complier 160 with respect to using the local variable 215 in the uninitialized state as an operand for an operation 210. In block 540, an object code 217 for tracking initialization and usage of the local variable 215 at runtime in view of the source code 202 is generated.

Figure 5B:
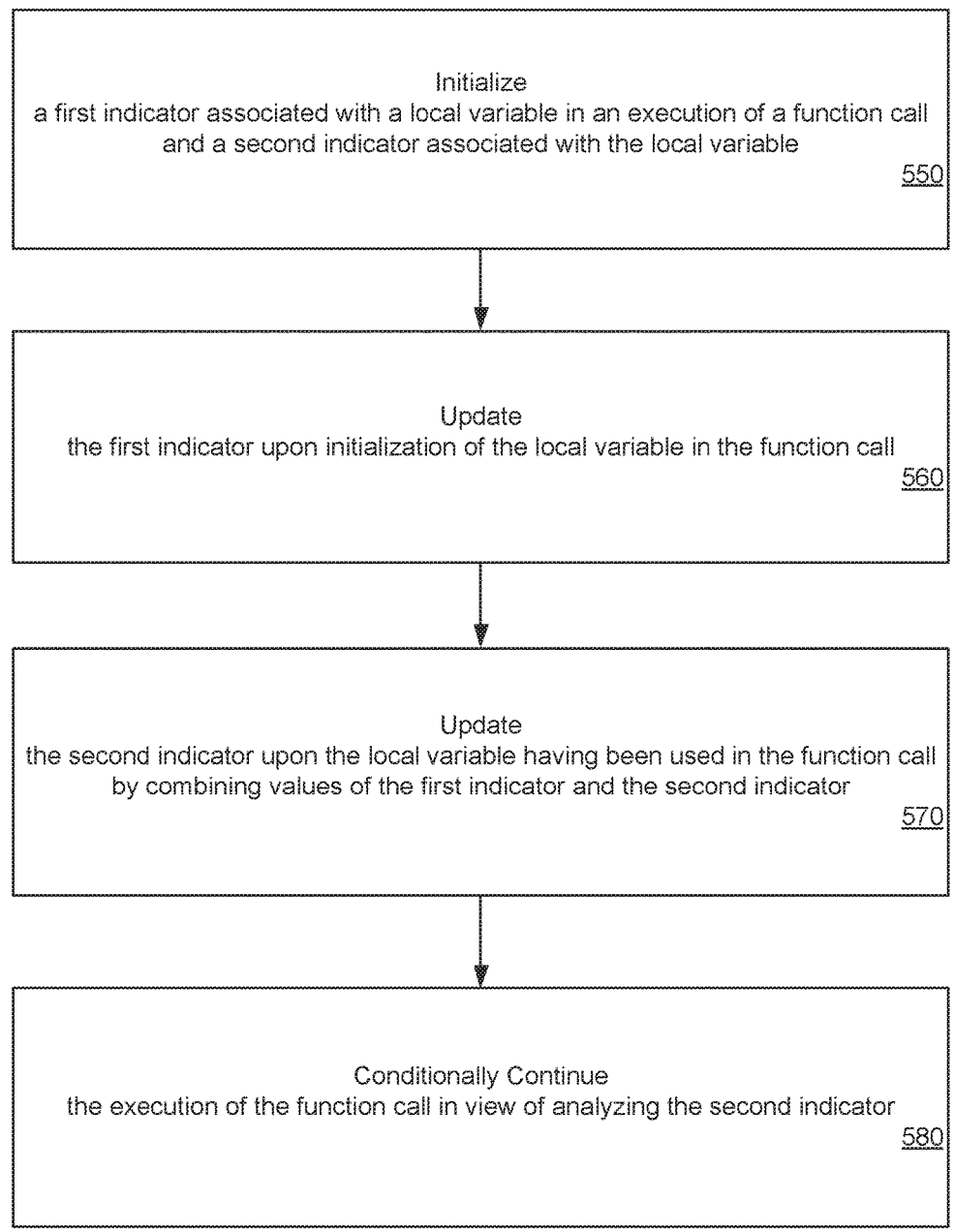

FIG. 5B is a flow diagram of a method 500 of supporting compiler variable instrumentation for uninitialized memory references according to an implementation of the disclosure. In one implementation, method 545 may be performed by the uninitialized variable detector 165 as executed by processing device 120 of FIG. 1 as described herein. The method 545 may be performed by processing logic that may comprise hardware (circuitry, dedicated logic, etc.), software (e.g., software executed by a general purpose computer system or a dedicated machine), or a combination of both. In alternative implementations, some or all of the method 545 may be performed by other components of system 100. It should be noted that blocks depicted in FIG. 5B can be performed simultaneously or in a different order than that depicted.

Referring to FIG. 5B, method 545 begins at block 550 where a first indicator associated with a local variable in an execution of a function call and a second indicator associated with the local variable are initialized. In block 560, the first indicator is updated upon initialization of the local variable in the function call. In block 570, the second indicator is updated upon the local variable having been used in the function call by combining values of the first indicator and the second indicator. Method 545 conditionally continues the execution of the function call in block 580 in view of analyzing the second indicator.

FIG. 6 is a flow diagram of another method 600 of supporting compiler variable instrumentation for uninitialized memory references according to an implementation of the disclosure. In one implementation, method 600 may be performed by the uninitialized variable detector 165 as executed by processing device 120 of FIG. 1 as described herein. The method 600 may be performed by processing logic that may comprise hardware (circuitry, dedicated logic, etc.), software (e.g., software executed by a general purpose computer system or a dedicated machine), or a combination of both. In alternative implementations, some or all of the method 600 may be performed by other components of the system 100. It should be noted that blocks depicted in FIG. 6 can be performed simultaneously or in a different order than that depicted.

Referring to FIG. 6, method 600 begins at block 610 where source code of a function comprising a local variable is received. A prologue for the function is generated in block 620 to initialize a first indicator and a second indicator associated with a local variable. The source code is instrument in block 630 to update the first indicator upon initialization of the local variable in the function call, and update the second indicator upon the local variable being used in the function call by combining values of the first indicator and the second indicator. In block 640, an epilogue for the function is generated to conditionally continue the execution of the function call in view of analyzing the second indicator.

Figure 7:
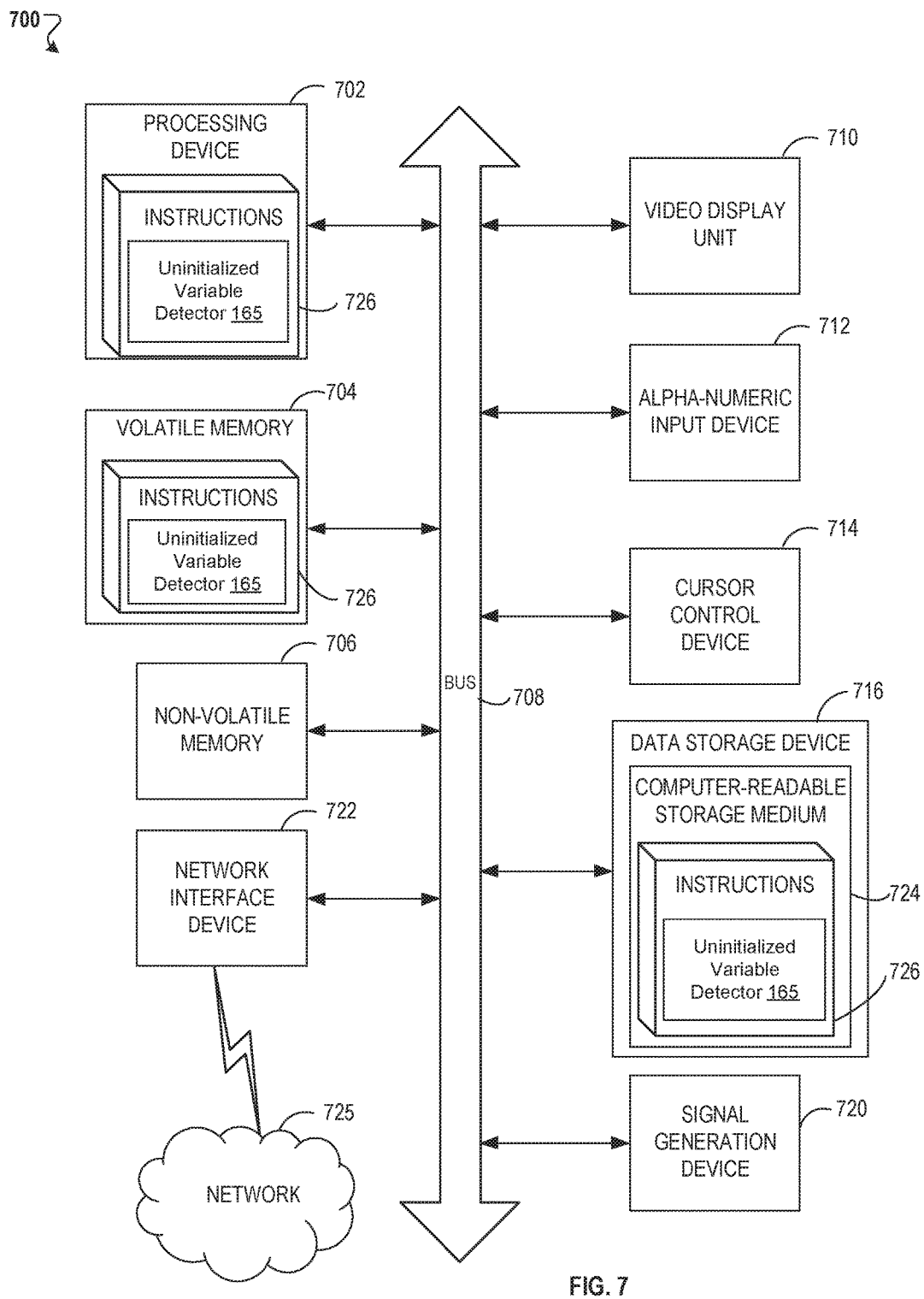
FIG. 7 is a block diagram illustrating a machine in which implementations of the disclosure may be used.

FIG. 7 illustrates a diagrammatic representation of a machine in the example form of a computer system 700 within which a set of instructions, for causing the machine to perform any one or more of the methodologies discussed herein, may be executed. In various illustrative examples, computer system 700 may correspond to the processing device 120 of FIG. 1, the system 200 of FIG. 2, or the apparatus 300 of FIG. 3 or the apparatus 400 of FIG. 4. In some implementations, the computer system 700 may support compiler variable instrumentation for uninitialized memory references.

The computer system 700 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware of the virtualized data center. For example, the VM may operate based on computer architecture and functions of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for supporting manifest list for multi-platform application container images.

The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 716, which communicate with each other via a bus 708.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is to execute the processing logic 726 for performing the operations and steps discussed herein.

The computer system 700 may further include a network interface device 722 communicably coupled to a network 725. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

Instructions 726 may reside, completely or partially, within volatile memory 704 and/or within processing device 702 during execution thereof by computer system 700, hence, volatile memory 704 and processing device 702 may also constitute machine-readable storage medium 724. The instructions 726 may also implement the uninitialized variable detector 165 to support compiler variable instrumentation for uninitialized memory references.

Data storage device 716 may include a computer-readable storage medium 724 (e.g., a non-transitory computer-readable storage medium) on which may store instructions 726 encoding any one or more of the methods or functions described herein, including instructions for implementing method 500 of FIG. 5 and method 600 of FIG. 6 for supporting compiler variable instrumentation for uninitialized memory references.

The non-transitory machine-readable storage medium 724 may also be used to store instructions 726 to support manifest list for multi-platform application container images described herein, and/or a software library containing methods that call the above applications. While the machine-accessible storage medium 724 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

It is to be understood that the above description is intended to be illustrative, and not restrictive. Many other implementations are apparent upon reading and understanding the above description. The scope of the disclosure should, therefore, be determined with reference to the appended claims, along with the full scope of equivalents to which such claims are entitled.

In the above description, numerous details are set forth. It is apparent, however, that the disclosure may be practiced without these specific details. In some instances, structures and devices are shown in block diagram form, rather than in detail, in order to avoid obscuring the disclosure.

Other computer system designs and configurations may also be suitable to implement the systems and methods described herein. The following examples illustrate various implementations in accordance with one or more aspects of the present disclosure.

Example 1 includes a method, comprising: identifying, by a processor executing a compiler, a reference to a local variable in a source code; determining, by the compiler, a possible usage of the local variable in an uninitialized state as an operand for an operation; identifying, in the source code, a notation associated with the local variable for suppressing a warning by the complier with respect to using the local variable in the uninitialized state as an operand for an operation; and generating, by the compiler in view of the source code, an object code for tracking initialization and usage of the local variable at runtime.

Example 2 includes the method of example 1, wherein the notation is provided by a code statement assigning a value of the local variable to the local variable.

Example 3 includes the method of example 1, wherein the notation is provided by an attribute associated with the local variable.

Example 4 includes the method of example 1, generating the object code for tracking initialization and usage of the local variable at runtime further comprises: generating a first object code fragment for initializing a first indicator associated with the local variable and a second indicator associated with the local variable; generating a second object code fragment for updating the first indicator upon initialization of the local variable; and generating a third object code fragment for updating the second indicator upon using the local variable as an operand of an operation.

Example 5 includes the method of example 4, wherein updating the second indicator comprises combining, by a logical operation, values of the first indicator and the second indicator.

Example 6 includes the method of example 4, generating the object code for tracking initialization and usage of the local variable at runtime further comprises: generating a fourth object code fragment for conditionally continuing execution in view of analyzing the second indicator.

Example 7 includes the method of example 4, wherein at least one of the first indicator and the second indicator is represented by a bit flag.

Example 8 includes the method of example 1, further comprising storing the first indicator and the second indicator in a memory space on a stack associated with the local variable.

Example 9 includes a system comprising: a memory to store stack data; and a processing device, operatively coupled to the memory, to: initialize a first indicator associated with a local variable in an execution of a function call and a second indicator associated with the local variable; update the first indicator upon initialization of the local variable in the function call; update the second indicator upon the local variable having been used in the function call by combining values of the first indicator and the second indicator; and conditionally continue the execution of the function call in view of analyzing the second indicator.

Example 10 includes the system of example 9, wherein to initialize, the processing device is to set the values of the first indicator to indicate that the local variable is uninitialized and the second indicator to indicate that the local variable is not used.

Example 11 includes the system of example 10, wherein to analyze, processing device is further to, responsive to determining that the value of second indicator is updated to indicate that the local variable is used, abort the execution of the function call.

Example 12 includes the system of example 9, further comprising a stack, and the processing device is further to push the first indicator and the second indicator onto the stack.

Example 13 includes the system of example 9, further comprising a first register and a second register, and wherein the processing device is further to store values for the first indicator in the first register and the second indicator in the second register.

Example 14 includes the system of example 9, wherein the processing device is further to use a logical operation to combine the values of the first indicator and the second indicator.

Example 15 includes the system of example 14, wherein the processing device is further to: generate a resulting value of the logical operation in view of the combined of the values; and update the value of the second indicator with the resulting value.

Example 16 includes the system of example 14, wherein the logical operation further comprises multiplying the value of the first indicator and the value of the second indictor.

Example 17 includes a non-transitory computer-readable medium comprising instructions that, when executed by a processing device, cause the processing device to: initialize, by the processing device, a first indicator associated with a local variable in an execution of a function call and a second indicator associated with the local variable; update the first indicator upon initialization of the local variable in the function call; update the second indicator upon the local variable having been used in the function call by combining values of the first indicator and the second indicator; and conditionally continue the execution of the function call in view of analyzing the second indicator.

Example 18 includes the non-transitory computer-readable medium of example 17, wherein to initialize, the processing device is to set the values of the first indicator to indicate that the local variable is uninitialized and the second indicator to indicate that the local variable is not used.

Example 19 includes the non-transitory computer-readable medium of example 18, wherein to analyze, processing device is further to, responsive to determining that the value of second indicator is updated to indicate that the local variable is used, abort the execution of the function call.

Example 20 includes the non-transitory computer-readable medium of example 17, wherein the processing device is further to push the first indicator and the second indicator onto a stack.

Example 21 includes the non-transitory computer-readable medium of example 17, wherein the processing device is further to store values for the first indicator in a first register and the second indicator in a second register.

Example 22 includes the non-transitory computer-readable medium of example 17, wherein the processing device is further to use a logical operation to combine the values of the first indicator and the second indicator.

Example 23 includes the non-transitory computer-readable medium of example 22, wherein the processing device is further to: generate a resulting value of the logical operation in view of the combined of the values; and update the value of the second indicator with the resulting value.

Example 24 includes the non-transitory computer-readable medium of example 22, wherein the logical operation further comprises multiplying the value of the first indicator and the value of the second indictor.

Example 25 include an apparatus comprising: a processing device; means for receiving source code of a function comprising a local variable; means for generating a prologue for the function to initialize a first indicator and a second indicator associated with a local variable; means for instrumenting the source code to update the first indicator upon initialization of the local variable in the function call, and update the second indicator upon the local variable being used in the function by combining values of the first indicator and the second indicator; and means for generating an epilogue for the function to conditionally continue the execution of the function call in view of analyzing the second indicator.

Example 26 includes the apparatus of example 25, wherein the initializing further comprises setting the values of the first indicator to indicate that the local variable is uninitialized and the second indicator to indicate that the local variable is not used.

Example 27 includes the apparatus of example 26, wherein the analyzing further comprises, responsive to determining that the value of second indicator is updated to indicate that the local variable is used, aborting the execution of the function.

Example 28 includes the apparatus of example 25, further comprising pushing the first indicator and the second indicator onto the stack.

Example 29 includes the apparatus of example 25, further comprising storing values for the first indicator in the first register and the second indicator in the second register.

Example 30 includes the apparatus of example 25, wherein the combining further comprises using a logical operation to combine the values of the first indicator and the second indicator.

Example 31 includes the apparatus of example 30, wherein the combining further comprises: generating a resulting value of the logical operation in view of the combined of the values; and updating the value of the second indicator with the resulting value.

Example 32 includes the method of example 30, wherein the logical operation further comprises multiplying the value of the first indicator and the value of the second indictor.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "compiling", "instrumenting", "generating", "determining", "inserting", "executing", "identifying" "setting", "receiving" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems appears as set forth in the description below. In addition, the disclosure is not described with reference to any particular programming language. It is appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method, comprising:
   identifying, by a processor executing a compiler, a reference to a local variable in a source code;
   determining, by the compiler, that there can be a usage of the local variable in an uninitialized state as an operand for an operation;
   responsive to the determining, identifying, in the source code, a notation associated with the local variable for suppressing a warning by the compiler with respect to using the local variable in the uninitialized state as an operand for an operation; and
   generating, by the compiler in view of the source code, an object code for tracking initialization of the local variable at runtime using a first indicator corresponding to the object code and for tracking usage of the local variable at runtime using a second indicator corresponding to the object code, wherein a value of the second indicator is a function of the first indicator, and wherein execution of a function of the source code is conditional in view of analysis of the second indicator, wherein generating the object code for tracking initialization and usage of the local variable at runtime further comprises:
   generating a first object code fragment for initializing the first indicator associated with the local variable and the second indicator associated with the local variable;
   generating a second object code fragment for updating the first indicator upon initialization of the local variable; and
   generating a third object code fragment for updating the second indicator upon using the local variable as an operand of an operation.

2. The method of claim 1, wherein the notation is provided by a code statement assigning a value of the local variable to the local variable.

3. The method of claim 1, wherein the notation is provided by an attribute associated with the local variable.

4. The method of claim 1, wherein updating the second indicator comprises combining, by a logical operation, values of the first indicator and the second indicator.

5. The method of claim 1, generating the object code for tracking initialization and usage of the local variable at runtime further comprises:
   generating a fourth object code fragment for conditionally continuing execution in view of analyzing the second indicator.

6. The method of claim 1, wherein at least one of the first indicator and the second indicator is represented by a bit flag.

7. The method of claim 1, further comprising storing the first indicator and the second indicator in a memory space on a stack associated with the local variable.

8. A system comprising:
   a memory to store stack data; and
   a processing device, operatively coupled to the memory, to:
   initialize a first indicator associated with a local variable in an execution of a function call and a second indicator associated with the local variable;
   update the first indicator upon initialization of the local variable in the function call;
   update the second indicator upon the local variable having been used in the function call by combining values of the first indicator and the second indicator, wherein the values of the first indicator and the second indicator are combined using a logical operation, wherein the processing device to update the second indicator further comprises the processing device to:
- generate a resulting value of the logical operation in view of the combined of the values; and
- update the value of the second indicator with the resulting value; and conditionally continue the execution of the function call in view of analyzing the second indicator.

9. The system of claim 8, wherein to initialize, the processing device is to set the values of the first indicator to indicate that the local variable is uninitialized and the second indicator to indicate that the local variable is not used.

10. The system of claim 9, wherein to analyze, processing device is further to, responsive to determining that the value of second indicator is updated to indicate that the local variable is used, abort the execution of the function call.

11. The system of claim 8, further comprising a stack, and the processing device is further to push the first indicator and the second indicator onto the stack.

12. The system of claim 8, further comprising a first register and a second register, and wherein the processing device is further to store values for the first indicator in the first register and the second indicator in the second register.

13. The system of claim 8, wherein the logical operation further comprises multiplying the value of the first indicator and the value of the second indicator.

14. A non-transitory computer-readable medium comprising instructions that, when executed by a processing device, cause the processing device to:
- receive, by a complier executed by the processing device, source code of a function comprising a local variable;
- generate, by the complier, a prologue for the function to initialize a first indicator and a second indicator associated with a local variable;
- instrument, by the complier, the source code to update the first indicator upon initialization of the local variable in the function call, and update the second indicator upon the local variable being used in the function by combining values of the first indicator and the second indicator, wherein the values of the first indicator and the second indicator are combined using a logical operation, and wherein to combine, the processing device is further to:
  - generate a resulting value of the logical operation in view of the combined of the values; and
  - update a value of the second indicator with the resulting value; and
- generate, by the complier, an epilogue for the function to conditionally continue the execution of the function call in view of analyzing the second indicator.

15. The non-transitory computer-readable medium of claim 14, wherein to generate the resulting value, the processing device is further to multiply a value of the first indicator and the value of the second indicator.

* * * * *